United States Patent [19]

Webber

[11] Patent Number: 5,348,341
[45] Date of Patent: Sep. 20, 1994

[54] METHOD OF FOLDING AN AIR BAG

[75] Inventor: James L. Webber, Spring Valley, Ohio

[73] Assignee: General Motors Corporation, Detroit, Mich.

[21] Appl. No.: 143,889

[22] Filed: Nov. 1, 1993

[51] Int. Cl.⁵ .............................................. B60R 21/16
[52] U.S. Cl. ............................ 280/728 R; 280/728 A; 280/732; 280/743 R
[58] Field of Search ........... 280/728 R, 728 A, 728 B, 280/732, 731, 730 R, 743 R

[56] References Cited

U.S. PATENT DOCUMENTS

| | | | |
|---|---|---|---|
| 3,801,126 | 4/1974 | Knight, IV et al. | 280/732 |
| 4,173,356 | 11/1979 | Ross | 280/728 A |
| 5,022,675 | 6/1991 | Zelenak, Jr. et al. | 280/743 R |
| 5,022,676 | 6/1991 | Rogerson et al. | 280/728 A |
| 5,178,407 | 1/1993 | Kelley | 280/728 R |

Primary Examiner—Kenneth R. Rice
Attorney, Agent, or Firm—Charles E. Leahy

[57] ABSTRACT

A method of folding an air bag for a supplemental inflatable restraint system in a vehicle in which the air bag is folded along diverging diagonal lines to form a pointed tail at a location distal from a front edge of the air bag. The air bag is then folded along substantially parallel lateral fold lines to produce a final desired width for the folded air bag. Subsequently, the air bag is formed into a roll starting from the pointed tail and rolling toward the front edge. The rolled air bag is then packed within a module attached adjacent to the front edge of the air bag. During deployment of the air bag, the rolled tail portion of the air bag is initially trapped within the module such that the pressure initially builds within the forward portion of the air bag with improved control over the forces exerted by the air bag.

14 Claims, 5 Drawing Sheets

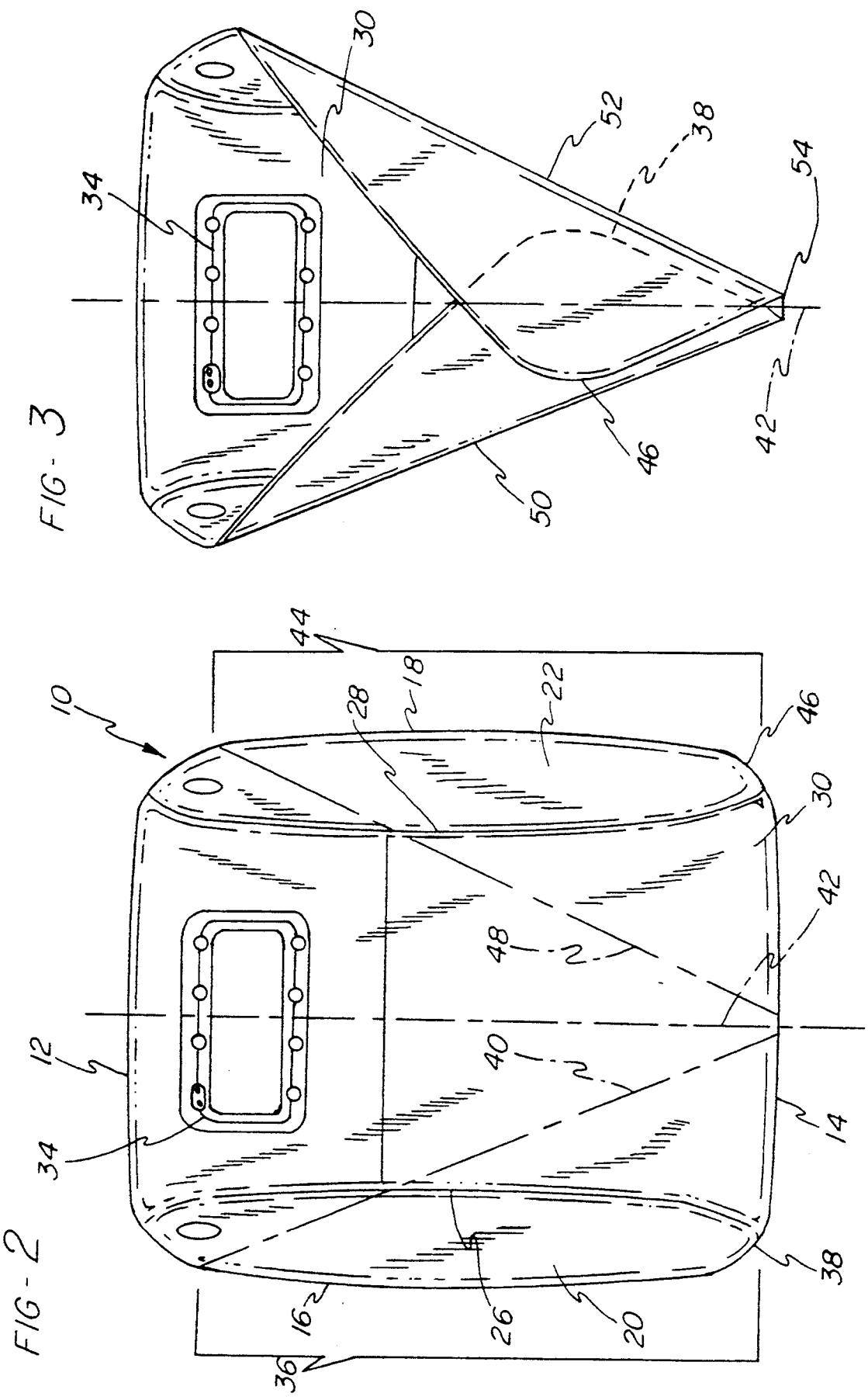

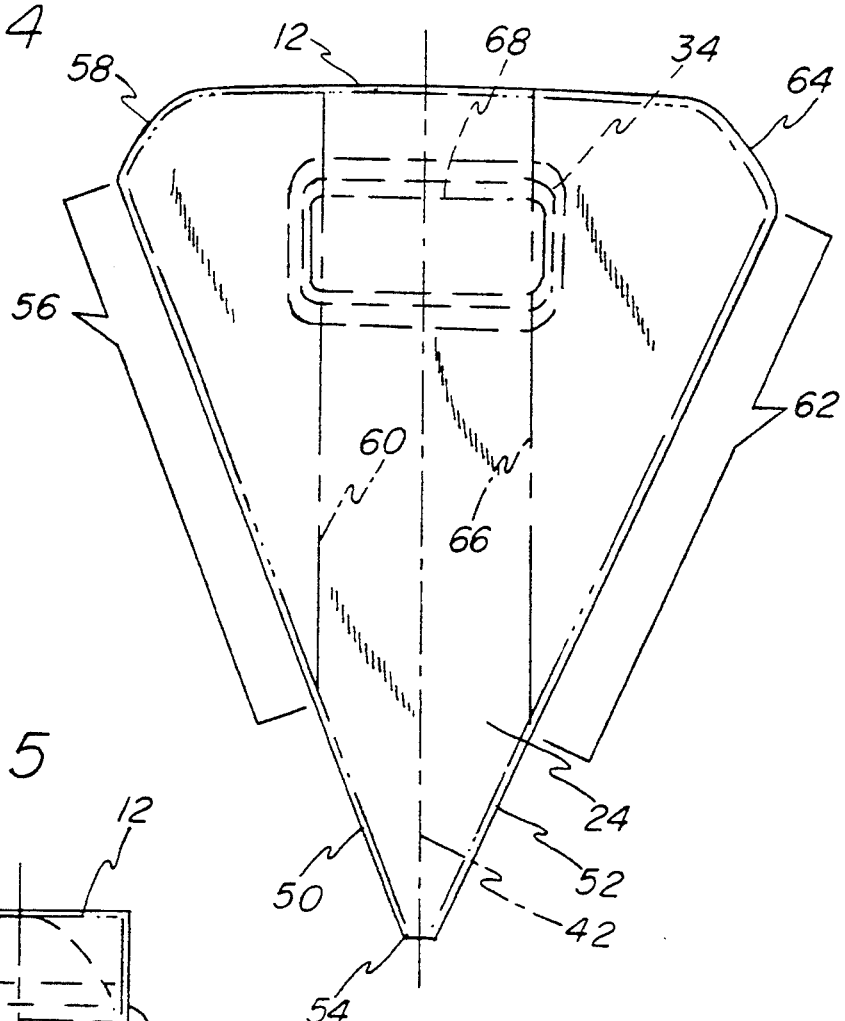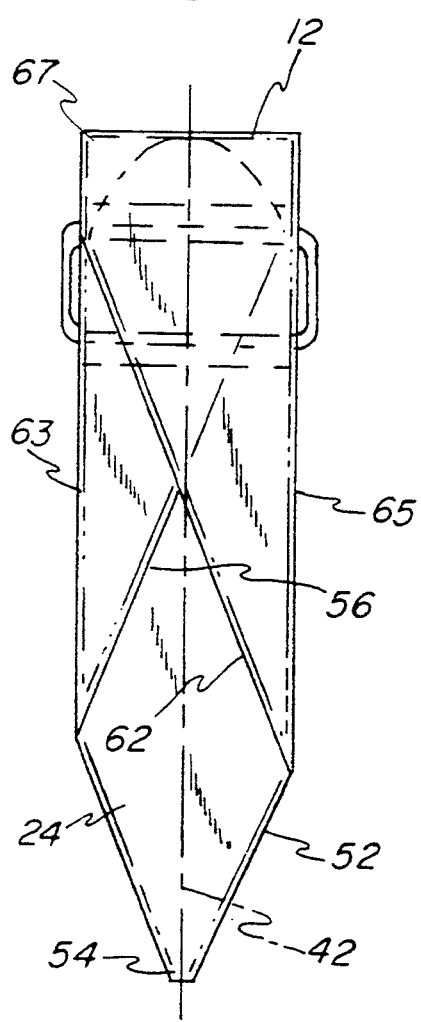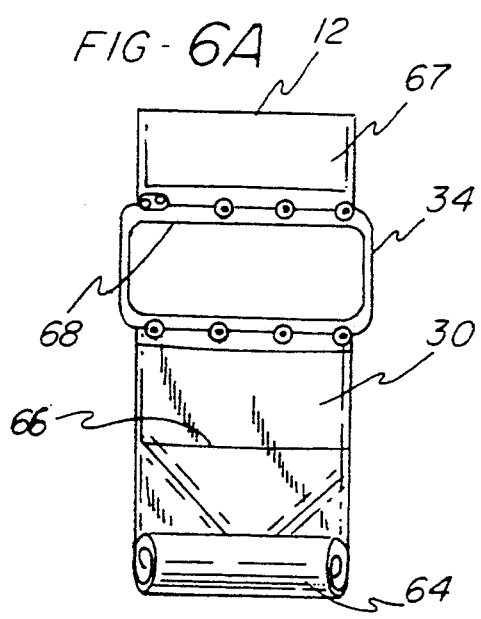

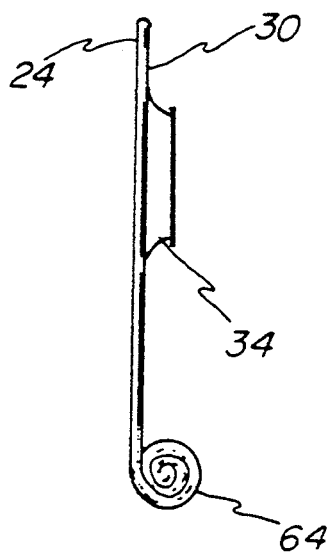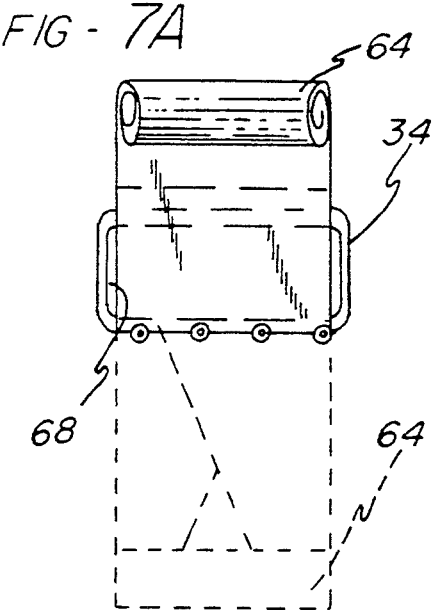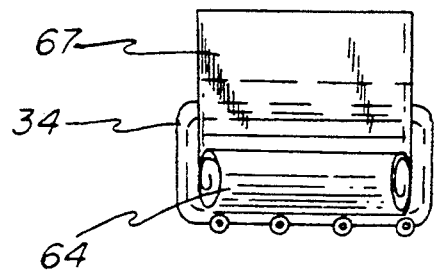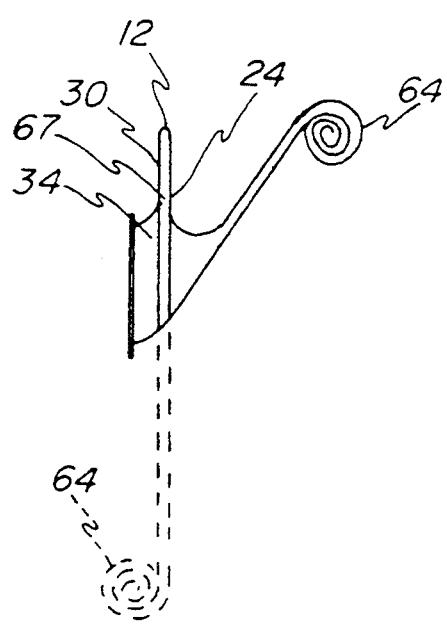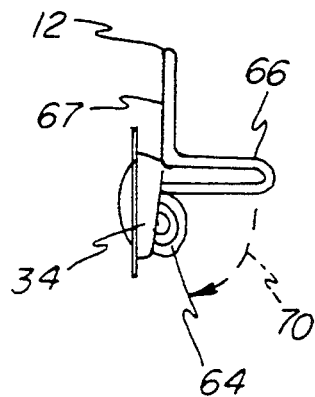

METHOD OF FOLDING AN AIR BAG

BACKGROUND OF THE INVENTION

1. Field of the Invention

The present invention relates to a folded air bag for use in a supplemental inflatable restraint system of a vehicle and, more particularly, to an improved method of folding an air bag.

2. Description of the Prior Art

In known supplemental inflatable restraint systems, a module containing an air bag is mounted within a vehicle such that the air bag may be deployed in the event of an accident. For example, the module may be mounted within the dashboard of the vehicle to restrain an occupant in the front passenger seat.

The characteristics of the air bag during deployment are related to the method in which the air bag is folded for storage within the module.

SUMMARY OF THE INVENTION

It is therefore a primary object of the present invention to provide an improved method of folding an air bag.

In one aspect of the invention, a method of folding an air bag for a vehicle supplemental restraint system is provided comprising the steps of providing an air bag in a substantially flattened position wherein the air bag has a front edge and a rear edge at longitudinally spaced ends thereof. The air bag is folded along lines extending between the front and rear edges to form a point adjacent to the rear edge, and the air bag is then formed into a roll starting at the point and rolling the air bag toward the front edge.

In a further aspect of the invention, the step of forming a point adjacent to the rear edge of the air bag includes folding the air bag along first and second diagonal fold lines wherein the diagonal fold lines extend in diverging relationship from a central location on the rear edge toward the front edge.

In yet another aspect of the invention, the air bag is folded along first and second substantially parallel lateral fold lines extending in a direction from the front edge toward the rear edge to define a width for the roll. During folding of the air bag along the diagonal fold lines, major lateral portions of the air bag are preferably folded over a bottom face of the air bag, and during folding of the air bag along the lateral fold lines, minor lateral portions of the air bag are preferably folded over a top face of the air bag.

In a further aspect of the invention, the air bag is provided with an inflation passage adjacent to the front edge for directing an inflating fluid into the air bag. The inflation passage is connected to a module for mounting to the vehicle and the rolled air bag is placed within the module in a final storage position.

Other objects and advantages of the invention will be apparent from the following description, the accompanying drawings and the appended claims.

BRIEF DESCRIPTION OF THE DRAWINGS

FIG. 2 is a plan view of a bottom side of the air bag of FIG. 1 which has been flattened and which illustrates the diagonal fold lines of the present invention.

FIG. 3 is a plan view of a bottom side of the air bag folded along the diagonal fold lines in accordance with the present invention.

FIG. 4 is a top plan view of the folded air bag of FIG. 3 and illustrating lateral fold lines.

FIG. 5 is a top plan view of the air bag folded along the lines illustrated in FIG. 4.

FIGS. 6A and 6B are bottom and side views, respectively, illustrating the air bag of FIG. 5 subsequent to a step of rolling the air bag.

FIGS. 7A and 7B are top and side views, respectively, illustrating placement of the rolled air bag subsequent to the steps shown in FIGS. 6A and 6B.

FIGS. 8A and 8B are top and side views, respectively, illustrating placement of the air bag into a module.

DETAILED DESCRIPTION OF THE PREFERRED EMBODIMENT

Figure 1:
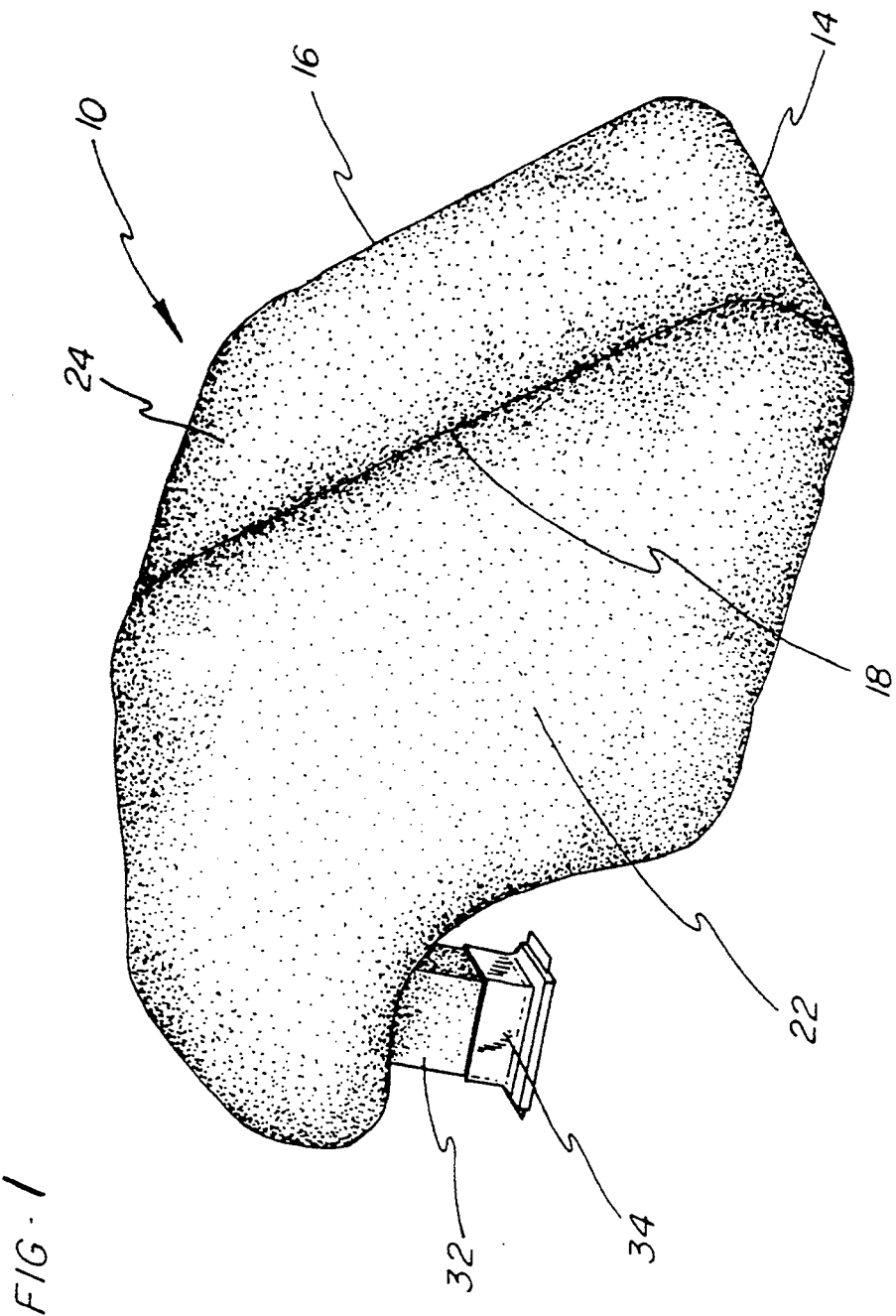
FIG. 1 is a perspective view illustrating a fully deployed known air bag to be folded in accordance with the present invention.

Referring initially to FIGS. 1 and 2, the present invention relates to the folding of an air bag 10 of known construction. The air bag 10 includes a front edge 12, a rear edge 14 longitudinally spaced from the front edge 12 and first and second lateral edges 16, 18 extending between the front and rear edges 12 and 14. It should be understood that the lateral edges 16, 18 are defined by the intersection of opposing lateral sides 20, 22 with a top surface 24 of the air bag, and that additional intersection lines 26, 28 are defined at the intersection of the sides 20, 22 with a bottom air bag surface 30.

The air bag 10 further includes a snout 32 defining an inflation passage adjacent to the front edge 12 for directing an inflating fluid, such as nitrogen gas, into the air bag 10. The snout 32 is attached to a rigid retainer or module 34 for mounting the air bag 10 to a rigid vehicle structure, such as a dashboard.

Referring to FIGS. 2 and 3, in accordance with the present method of folding the air bag 10, air bag 10 is initially placed with the top surface 24 facing downwardly and the bottom surface 30 facing upwardly. A major lateral portion 36, defined along the first lateral edge 16 from a first rear corner 38 toward the front edge 12 thereof, is folded over the rear surface 30 along a first diagonal fold line 40. In this position, the corner 38 is positioned extending across a central longitudinal axis 42 which generally extends through the center of the module 34.

Subsequently, an opposing major lateral portion 44 of the air bag 10, defined along the second lateral edge 18 from a second rear corner 46 toward the front edge 12 thereof, is folded over the rear face 30 along a second diagonal fold line 48 such that the corner 46 extends across the longitudinal axis 42 in the same manner as the corner 38. The first and second diagonal fold lines 40, 48 extend in diverging relationship from a location adjacent to the intersection between the longitudinal axis 42 and the rear edge 14 toward the front edge 12, and folding of the air bag along the fold lines 40, 48 results in first and second diagonal edges 50, 52 defining a V-shaped rear portion for the air bag 10 such that the air bag tapers down to a narrow tail or point 54 and has a generally triangular configuration.

Referring to FIGS. 4 and 5, the air bag 10 is then placed with its rear surface 30 facing downwardly and its top surface 24 facing upwardly. A minor lateral portion 56, extending from a front corner 58 toward the point 54, is folded along a first lateral fold line 60 across the front surface 24, such that the front corner 58 extends across the central longitudinal axis 42. Similarly, an opposing minor lateral portion 62, extending from a front corner 64 toward the point 54, is folded across the front surface 24 along a second lateral fold line 66, such that the corner 64 extends across the longitudinal axis 42.

It should be noted that the lateral fold lines 60, 66 are substantially parallel to each other and that folding the air bag along the lateral fold lines 60, 66 results in opposing, substantially parallel lateral sides 63, 65 forming a width for the air bag 10 which is less than the width of an opening 68 defined by the module 34. In addition, a flap 67 is defined extending between the front edge 12 and the module 34.

Referring to FIGS. 6A and 6B, the air bag is then turned over, such that the bottom surface 30 is facing upwardly, and the air bag 10 is formed into a roll 64, starting at the point 54 and rolling along the bottom surface 30 toward the front edge 12. For example, starting at the pointed end 54, the air bag 10 may be rolled around a narrow square bar with the material of the roll 64 being rolled as tightly as possible. The air bag 10 is rolled until the roll 64 is located a predetermined distance away from a center panel seam 66 for the air bag 10.

As may be further seen in FIGS. 7A and 7B, the air bag is subsequently turned over to place the top face 24 facing upwardly and the roll 64 is moved up toward the front edge 12. The roll 64 is then placed within the module 34 to form an upstanding flap 66, as is illustrated in FIGS. 8A and 8B. The upstanding flap 66 is then wrapped around the roll 64 in the direction shown by the arrow 70.

Figure 9A:
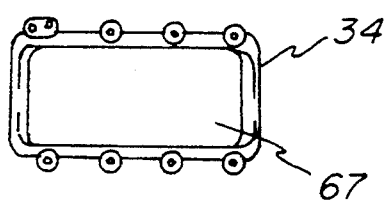
FIGS. 9A and 9B are top and side views, respectively, which illustrate the final configuration of the air bag within the module.
Figure 9B:
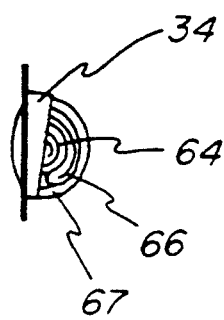

Finally, the flap 67 extending between the module 34 and the front edge 12 is folded around the roll 64 to complete the packing of the air bag 10 within the module 34, as is illustrated in FIGS. 9A and 9B.

Figure 10:
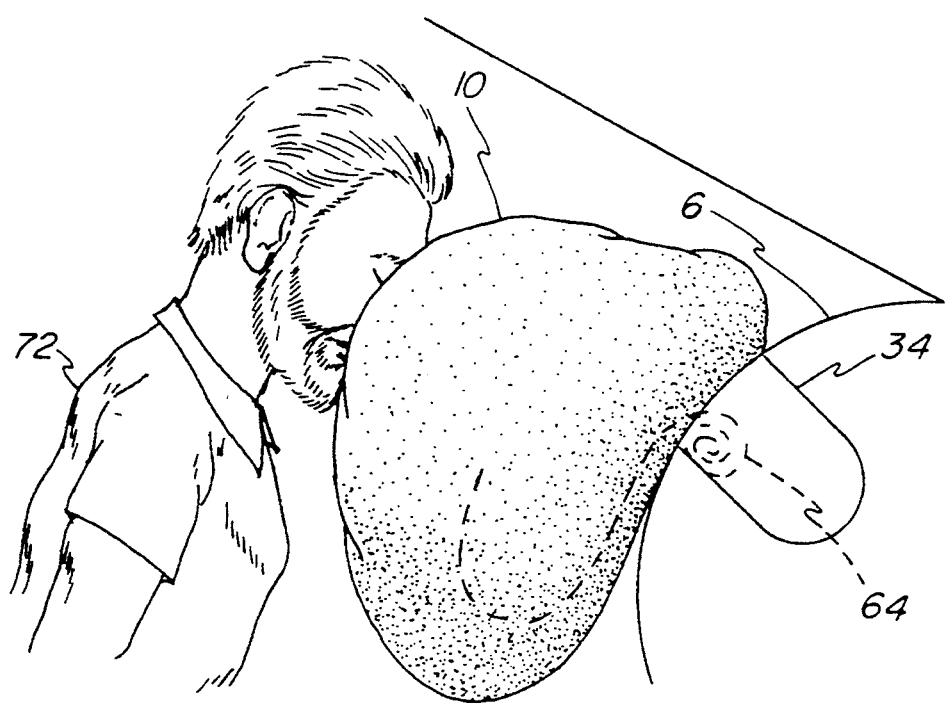
FIG. 10 is a side view showing initial partial deployment of an air bag folded in accordance with the present invention.

The above-described procedure for folding the air bag 10 provides an advantageous deployment of the air bag 10, as is illustrated in FIG. 10. In particular, the present method of folding an air bag is such that the diagonal folds producing the V-shaped configuration of the tail portion of the air bag extending to the point 54 facilitates retention of the roll 64 within the module 34 as pressure builds within the air bag 10.

Further, as a result of trapping the rolled portion 64 of the air bag 10 within the module 34, the pressure will build earlier within the air bag and additionally helps to ensure that expansion of the air bag begins in a central forward area adjacent to the module with the fabric forming the sides of the air bag 10 being pulled out first. In other words, the force of the air bag 10 is directed out to the sides in addition to being directed rearwardly and upwardly with the force applied by the air bag 10 being spread over a longer period of time.

While the method herein described and the folded air bag produced thereby, constitute a preferred embodiment of the invention, it is to be understood that this invention is not limited to this precise method, and that changes may be made therein without departing from the scope of the invention, which is defined in the appended claims.

I claim:

1. A method of folding an air bag for a vehicle supplemental restraint system comprising the steps of:
   (a) providing an air bag in a substantially flattened position, said air bag having a front edge and a rear edge at longitudinally spaced ends thereof;
   (b) folding said air bag along lines extending between said front and rear edges to form a point adjacent to said rear edge; and
   (c) forming said air bag into a roll, starting at said point and rolling said air bag toward said front edge.

2. The method as recited in claim 1 wherein step (b) further includes the step of:
   (b) (1) folding said air bag along first and second diagonal fold lines, said first and second diagonal fold lines extending in diverging relationship from a central location on said rear edge toward said front edge.

3. The method as recited in claim 2 wherein step (b) further includes the step of:
   (b) (2) folding said air bag along first and second substantially parallel lateral fold lines extending in a direction from said front edge toward said rear edge to define a width for said roll.

4. The method as recited in claim 3 wherein step (b) (1) comprises folding major lateral portions of said air bag over a bottom face of said air bag and step (b) (2) comprises folding minor lateral portions of said air bag over a top face of said air bag.

5. The method as recited in claim 4 wherein step (c) comprises rolling said air bag along said bottom face.

6. The method as recited in claim 1 including the step of:
   (d) placing said roll into a module connected to said air bag adjacent to said front edge.

7. A method of folding an air bag for a vehicle supplemental restraint system comprising the steps of:
   (a) providing an air bag in a substantially flattened position, said air bag including longitudinally spaced front and rear edges and first and second lateral edges connecting said front and rear edges, and an inflation passage adjacent to said front edge for directing an inflating fluid into said air bag;
   (b) folding a first rear corner across a central longitudinal axis of said air bag toward said second lateral edge and folding a second rear corner across said longitudinal axis toward said first lateral edge to form said air bag into a substantially triangular shape having a narrow point at the intersection of said central longitudinal axis with said rear edge;
   (c) folding opposing front corners toward each other across said central longitudinal axis to form substantially parallel edges extending from said front edge toward said rear edge with a pointed tail portion defined adjacent to said rear edge; and
   (d) rolling said air bag from said tail portion toward said front edge to form a rolled air bag.

8. The method as recited in claim 7 wherein step (b) comprises folding said air bag along first and second diagonal fold lines, said first and second fold lines extending in diverging relationship from said intersection of said central longitudinal axis with said rear edge toward said front edge.

9. The method as recited in claim 7 including the step of:
   (e) placing said rolled air bag into a module connected to said inflation passage.

10. The method as recited in claim 9 wherein step (d) comprises leaving a portion of said air bag unrolled adjacent to said inflation passage and step (e) includes forming a flap of said unrolled air bag and placing said flap over said rolled air bag in said module.

11. An air bag for a vehicle supplemental restraint system, said air bag comprising:

a front edge, a rear edge, and first and second lateral edges connecting said front and rear edges;

first and second diagonal fold lines extending in diverging relationship to each other from said rear edge toward said front edge to define a point adjacent to said rear edge;

substantially parallel lateral fold lines extending from said front edge toward said rear edge;. and wherein said air bag is formed in a roll with said point located at the center of said roll.

12. The air bag as recited in claim 11 wherein major lateral portions of said air bag extend from said first and second diagonal fold lines across a bottom face of said air bag and minor lateral portions of said air bag extend from said lateral fold lines across a top face of said air bag.

13. The air bag as recited in claim 11 including an inflation passage adjacent to said front edge for directing an inflating fluid into said air bag.

14. The air bag as recited in claim 13 including a module connected to said inflation passage wherein said roll is located within said module.

* * * * *